L. HARTSON.
Grain Steamer and Drier.
No. 215,919. Patented May 27, 1879.
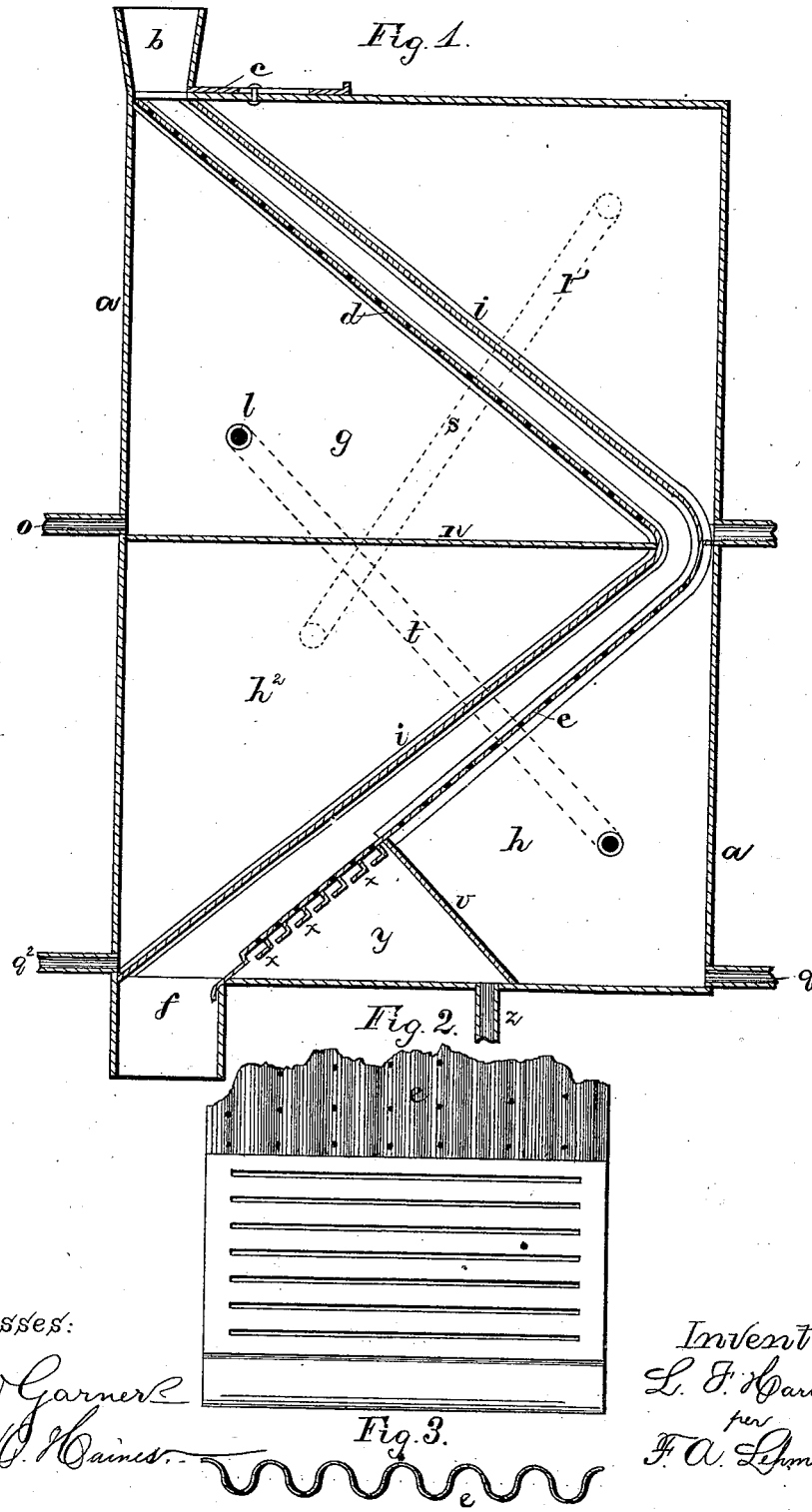

UNITED STATES PATENT OFFICE.

LA FAYETTE HARTSON, OF WYOMING, IOWA.

IMPROVEMENT IN GRAIN STEAMER AND DRIER.

Specification forming part of Letters Patent No. 215,919, dated May 27, 1879; application filed March 27, 1879.

*To all whom it may concern:*

Be it known that I, LA FAYETTE HARTSON, of Wyoming, in the county of Jones and State of Iowa, have invented certain new and useful Improvements in Grain Steamer and Drier; and I do hereby declare the following to be a full, clear, and exact description of the invention, such as will enable others skilled in the art to which it pertains to make and use it, reference being had to the accompanying drawings, which form part of this specification.

My invention relates to an improvement in grain steamers and driers; and it consists in the construction and arrangement of parts, that will be more fully described hereinafter, whereby the grain can be thoroughly steamed, dried, or warmed, and the moisture from the condensed steam prevented from passing out with the grain from the steamer.

Figure 1 is a vertical section of my invention, and Figs. 2 and 3 are details of the same.

$a$ represents the frame of the steamer, which is made of copper, or any other suitable metal, and which is suspended from the floor-joists at any suitable point between the stock-hopper and the hopper over the stones. Upon the top of this frame is formed the hopper $b$, which is provided with the slide $c$, so as to regulate the passage of the grain into the body or shut it entirely off. Leading from the bottom of this hopper diagonally across the frame is the corrugated and perforated incline $d$, down which the grain runs to the opposite side of the frame from which it enters, where it passes upon a second incline, $e$, and runs forward across the frame to the discharging-point $f$. Both of these inclines are corrugated, so as to present a much greater surface, and are perforated from their inner sides, so that every drop or particle of moisture from condensed steam, or any other source, will at once drip into the chamber $g$ or $h$ below. Running almost parallel with these two inclines are the corrugated plates $i$, with about an inch space between them and the inclines, which plates serve to keep the steam admitted through the pipe $l$ in immediate contact with the grain as it rolls down the inclines.

In order to prevent the grain from clogging up as it rolls down the two inclined passages, the lower passage is made about one-fourth of an inch wider toward its lower end, whereby the grain is caused to always flow evenly out.

The two chambers $g$ $h^2$ are separated from each other by the partition $n$, and the steam passes from the chamber $g$, through the fine perforations in the incline $d$, into the grain-tube, from whence it escapes after being condensed either back into the chamber $g$ or the chambers $h$ or $y$ below. All the condensed steam and moisture above this incline $d$ drips through these perforations into this chamber $g$, and is carried off through the pipe $o$. The chamber $h^2$, under the chamber $g$, will have steam admitted to it when it is desired to dry or warm the grain before passing into the burrs. The heat will radiate through the corrugated plate $i$ with sufficient force to very thoroughly dry the grain as it passes down, or in winter, as is frequently necessary, warm the grain to any desired extent. All water from condensed steam will pass off from this chamber through the pipe $q^2$. The upper chamber, $r$, on the opposite side of the frame, also serves the same purpose of warming the plate $i$, so as not only to warm and dry the grain, but prevent the steam that is acting on the grain from being condensed against the plate. These two chambers $r$ and $h^2$ are connected to the same steam-pipe by the pipe $s$. The lower chamber, $h$, is also a steam-chamber, and supplies the steam to the grain through the perforated incline $e$, and receives the drip from this incline, and is connected with the upper chamber, $g$, by a pipe, $t$, which pipe connects with a pipe to carry off the steam after it has done its work on the grain. Both of the pipes $s$ $t$ are provided with cocks, so that either one or both chambers may have the entrance of steam into it, or the exit of steam from it, cut off. The water from chamber $h$ is carried off through the pipe $q$.

Between the lower end of the incline $e$ and chamber $h$ is made the partition $v$, and from this partition down to the end of the incline there are placed the slats $x$, shaped as shown, with the openings between them running at right angles to the direction of the grain, so that it is impossible for the slightest moisture to pass out with the grain. All of the moisture that runs down the incline $e$ past the partition $v$ at once runs through one of the slits between the slats into the chamber $y$, from whence it passes off through the pipe $z$.

Owing to the relative positions of the two inclines, as the grain passes down them, should any of the grains run along down the first incline under the other grain, where the steam cannot act very well upon them, when the grains start down the second incline all of these bottom grains will be thrown on top of the others.

Having thus described my invention, I claim—

1. The combination of the two perforated inclines $d$ $e$, plates $i$, and chambers $g$ $h$, substantially as set forth.

2. The combination of the two perforated inclines $d$ $e$ and plates $i$ with the two chambers $g$ $h$, into which steam is admitted for steaming the grain, and the two chambers $h^2$ $r$, for drying or heating the grain, substantially as described.

3. The incline $e$, having slats running across it at right angles to the passage of the grain, so as to catch the moisture and prevent it from passing out with the grain, substantially as shown.

4. The combination of the incline $e$, slats $x$, partition $v$, and chamber $y$, substantially as described.

In testimony that I claim the foregoing I have hereunto set my hand this 1st day of March, 1879.

L. F. HARTSON.

Witnesses:
F. O. ELLISON,
C. H. COLLINS.